(12) United States Patent
Kato (10) Patent No.: US 11,613,259 B2
(45) Date of Patent: Mar. 28, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/560,429

(22) Filed: Dec. 23, 2021

(65) Prior Publication Data

US 2022/0203987 A1  Jun. 30, 2022

(30) Foreign Application Priority Data

Dec. 28, 2020  (JP) ............................. JP2020-218115

(51) Int. Cl.
*B60W 30/182* (2020.01)
*B60W 30/10* (2006.01)
*B60W 60/00* (2020.01)

(52) U.S. Cl.
CPC .......... *B60W 30/182* (2013.01); *B60W 30/10* (2013.01); *B60W 60/0053* (2020.02)

(58) Field of Classification Search
CPC ............... B60W 30/182; B60W 30/10; B60W 2520/10; B60W 2552/53; B60W 30/12; B60W 60/001; B60W 60/0061; B60W 60/007
See application file for complete search history.

(56) References Cited

U.S. PATENT DOCUMENTS

2020/0207346 A1\* 7/2020 Tsuji ..................... B60W 30/12
2022/0204054 A1\* 6/2022 Taniguchi ............. B60W 30/16

FOREIGN PATENT DOCUMENTS

| CN | 110281941 | 9/2019 |
| CN | 110446642 | 11/2019 |
| CN | 111746498 | 10/2020 |
| JP | 2012-051441 | 3/2012 |
| JP | 2017-132290 | 8/2017 |
| JP | 2018-189594 | 11/2018 |
| JP | 2019-006280 | 1/2019 |
| JP | 2019-159828 | 9/2019 |
| JP | 2020-059401 | 4/2020 |
| JP | 2020-104802 | 7/2020 |

OTHER PUBLICATIONS

Chinese Office Action for Chinese Patent Application No. 202111593267.2 dated Sep. 14, 2022.
Japanese Notice of Allowance for Japanese Patent Application No. 2020-218115 dated Jul. 5, 2022.

\* cited by examiner

*Primary Examiner* — Abby Y Lin
*Assistant Examiner* — Dylan M Katz
(74) *Attorney, Agent, or Firm* — Amin, Turocy & Watson, LLP (57) ABSTRACT

A vehicle control device recognizing a runway area in which a vehicle is to travel, generating a target trajectory such that the target trajectory follows a center of the recognized runway area in a lateral direction, causing the vehicle to travel along the target trajectory, and changing a drive mode of the vehicle from a second drive mode to a first drive mode in a case in which a distance between the center and a reference point of the vehicle is equal to or longer than a reference distance.

7 Claims, 6 Drawing Sheets

| DRIVE MODE | CONTROL STATE | TASK |
|---|---|---|
| MODE A | AUTOMATED DRIVING | FRONT-SIDE MONITORING: NOT REQUIRED<br>STEERING GRASPING: NOT REQUIRED |
| MODE B | DRIVING ASSISTING | FRONT-SIDE MONITORING: REQUIRED<br>STEERING GRASPING: NOT REQUIRED |
| MODE C | DRIVING ASSISTING | FRONT-SIDE MONITORING: REQUIRED<br>STEERING GRASPING: REQUIRED |
| MODE D | DRIVING ASSISTING | FRONT-SIDE MONITORING: REQUIRED<br>DRIVING OPERATION OF LOW DEGREE IS REQUIRED |
| MODE E | MANUAL DRIVING | FRONT-SIDE MONITORING: REQUIRED<br>DRIVING OPERATION IS REQUIRED FOR STEERING AND ACCELERATION/DECELERATION |

↑ TASK: LIGHT

↓ TASK: HEAVY

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2020-218115, filed Dec. 28, 2020, the content of which is incorporated herein by reference.

BACKGROUND

Field of the Invention

The present invention relates to a vehicle control device, a vehicle control method, and a storage medium.

Description of Related Art

An invention of an in-vehicle system including a storage determination processing unit repeatedly determining presence/absence of high-accuracy map information on a road that a subject vehicle has passed, a storage information acquisition processing unit acquiring information representing repeatedly determined results, and an automated driving availability notifying unit notifying of information acquired by the storage information acquisition processing unit has been disclosed (Japanese Unexamined Patent Application, First Publication No. 2018-189594).

SUMMARY

In a conventional technology, although automated driving availability is mechanically notified of using information stored in a map, a more complicated situation occurs in actual vehicle control, and thus appropriate determination is necessary.

The present invention is in view of such a situation, and one object thereof is to provide a vehicle control device, a vehicle control method, and a storage medium capable of more appropriately controlling switching between drive modes.

A vehicle control device, a vehicle control method, and a storage medium according to the present invention employ the following configurations.

(1): According to one aspect of the present invention, there is provided a vehicle control device including: a storage device storing a program; and a hardware processor executing the program stored in the storage device to: recognize a runway area in which a vehicle is to travel; generate a target trajectory such that the target trajectory follows a center of the recognized runway area in a lateral direction and cause the vehicle to travel along the target trajectory without depending on an operation of a driver of the vehicle; determine a drive mode of the vehicle as being one of a plurality of drive modes including a first drive mode and a second drive mode, the second drive mode being a drive mode in which a lighter task is imposed on the driver than that in the first drive mode, some of the plurality of drive modes including at least the second drive mode being modes in which the vehicle is caused to travel along the target trajectory without depending on an operation of a driver of the vehicle; change the drive mode of the vehicle a drive mode in which a heavier task is imposed on the driver, in a case in which a task relating to the determined drive mode is not performed by the driver; and change the drive mode of the vehicle from the second drive mode to the first drive mode, in a case in which a distance between the center and a reference point of the vehicle is equal to or longer than a reference distance.

(2): In the aspect (1) described above, the reference distance is set to a distance that is longer than a lane width corresponding to one lane and is shorter than a lane width corresponding to two lanes.

(3): In the aspect (1) described above, a plurality of drive modes of which tasks imposed on the driver are different from each other are included in the second drive mode, and the hardware processor changes the reference distance based on a drive mode that is being executed among the second drive modes.

(4): In the aspect (1) described above, the hardware processor changes the reference distance based on a speed of the vehicle.

(5): In the aspect (1) described above, the hardware processor changes the reference distance based on a curvature of a road on which the vehicle is present.

(6): In the aspect (1) described above, the reference point of the vehicle is a point on a center axis in a vehicle width direction of the vehicle.

(7): According to another aspect of the present invention, there is provided a vehicle control method using a computer, the vehicle control method including: recognizing a runway area in which a vehicle is to travel; generating a target trajectory such that the target trajectory follows a center of the recognized runway area in a lateral direction without depending on an operation of a driver of the vehicle and causing the vehicle to travel along the target trajectory; determining a drive mode of the vehicle as being one of a plurality of drive modes including a first drive mode and a second drive mode, the second drive mode being a drive mode in which a lighter task is imposed on the driver than that in the first drive mode, some of the plurality of drive modes including at least the second drive mode being modes in which the vehicle is caused to travel along the target trajectory without depending on an operation of a driver of the vehicle; change the drive mode of the vehicle a drive mode in which a heavier task is imposed on the driver in a case in which a task relating to the determined drive mode is not performed by the driver; and changing the drive mode of the vehicle from the second drive mode to the first drive mode in a case in which a distance between the center and a reference point of the vehicle is equal to or longer than a reference distance.

(8): A storage medium according to yet another aspect of the present invention is a computer-readable non-transitory storage medium storing a program thereon that causes a computer to execute: recognizing a runway area in which a vehicle is to travel; generating a target trajectory such that the target trajectory follows a center of the recognized runway area in a lateral direction without depending on an operation of a driver of the vehicle and causing the vehicle to travel along the target trajectory; determining a drive mode of the vehicle as being one of a plurality of drive modes including a first drive mode and a second drive mode, the second drive mode being a drive mode in which a lighter task is imposed on the driver than that in the first drive mode, some of the plurality of drive modes including at least the second drive mode being modes in which the vehicle is caused to travel along the target trajectory without depending on an operation of a driver of the vehicle; change the drive mode of the vehicle a drive mode in which a heavier task is imposed on the driver in a case in which a task relating to the determined drive mode is not performed by the driver; and changing the drive mode of the vehicle from the second drive mode to the first drive mode in a case in which a distance between the center and a reference point of the vehicle is equal to or longer than a reference distance.

According to the aspects (1) to (8) described above, switching control of drive modes can be performed more appropriately.

DESCRIPTION OF EMBODIMENTS

Hereinafter, a vehicle control device, a vehicle control method, and a storage medium according to embodiments of the present invention will be described with reference to the drawings.

[Entire Configuration]

Figure 1:
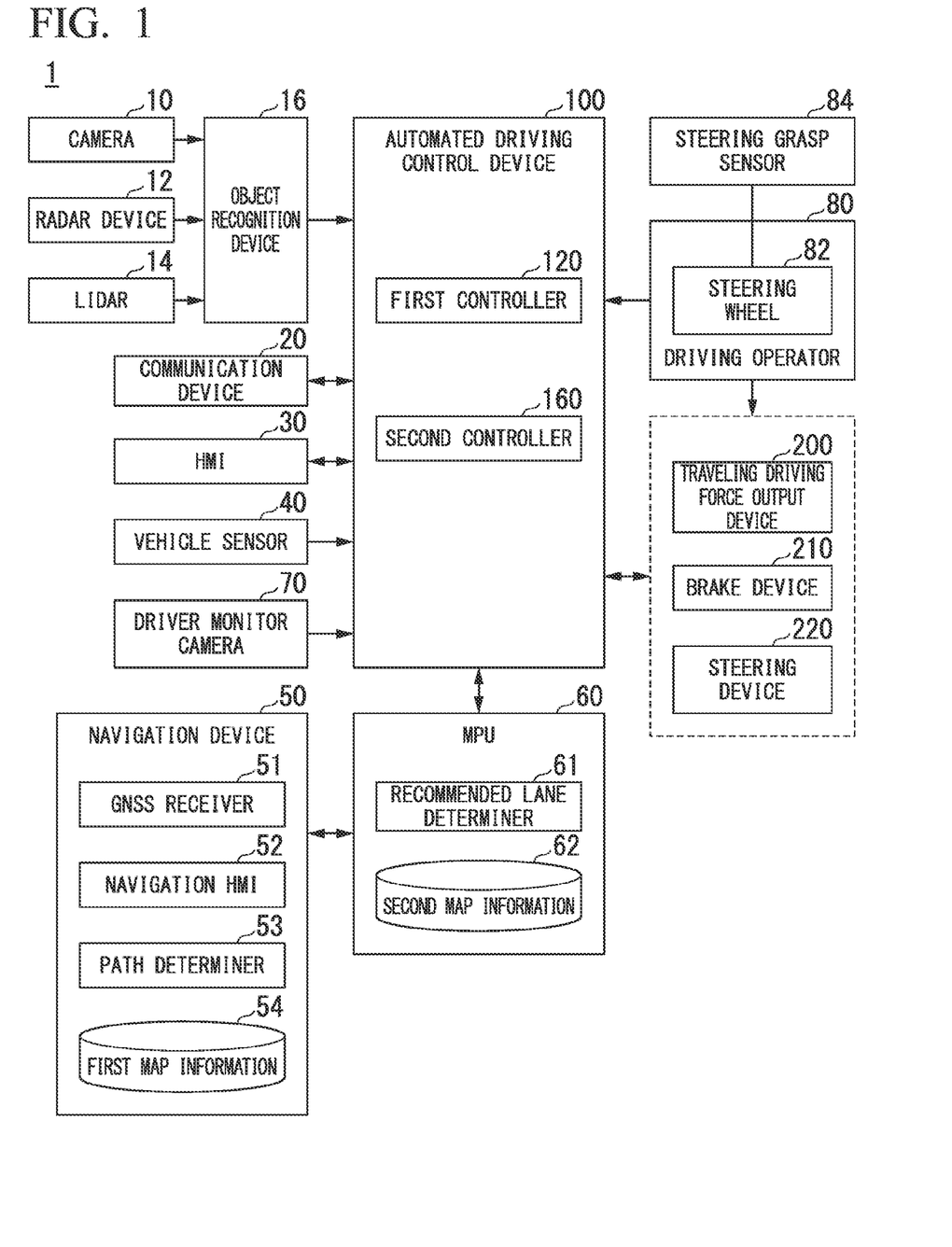
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or discharge power of a secondary cell or a fuel cell.

For example, the vehicle system 1 includes a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, an automated driving control device 100, a traveling driving force output device 200, a brake device 210, and a steering device 220. Such devices and units are mutually connected using a multiplexing communication line such as a controller area network (CAN) communication line, a serial communication line, a radio communication network, or the like. The configuration illustrated in FIG. 1 is merely an example, and a part of the configuration may be omitted, and an additional configuration may be further added.

The camera 10, for example, is a digital camera using a solid-state imaging device such as a charge coupled device (CCD) or a complementary metal oxide semiconductor (CMOS). The camera 10 is installed at an arbitrary place in a vehicle (hereinafter, a subject vehicle M) in which the vehicle system 1 mounted. In a case in which a side in front is to be imaged, the camera 10 is attached to an upper part of a front windshield, a rear face of a room mirror, or the like. The camera 10, for example, periodically images the vicinity of the subject vehicle M repeatedly. The camera 10 may be a stereo camera.

The radar device 12 emits radio waves such as millimeter waves to the vicinity of the subject vehicle M and detects at least a position of (a distance and an azimuth) an object by detecting radio waves (reflected waves) reflected by the object. The radar device 12 is installed at an arbitrary place on the subject vehicle M. The radar device 12 may detect a position and a speed of an object using a frequency modulated continuous wave (FM-CW) system.

The LIDAR 14 emits light (or a radiowave having a wavelength close to light) to the vicinity of the subject vehicle M and measures scattered light. The LIDAR 14 detects a distance to a target based on a time from light emission to light reception. For example, the emitted light is pulse-shaped laser light. The LIDAR 14 is attached to an arbitrary place in the subject vehicle M.

The object recognition device 16 performs a sensor function process for detection results acquired using some or all of the camera 10, the radar device 12, and the LIDARs 14, thereby recognizing a position, a type, a speed, and the like of an object. The object recognition device 16 outputs results of the recognition to the automated driving control device 100. The object recognition device 16 may directly output detection results acquired by the camera 10, the radar device 12, and the LIDAR 14 to the automated driving control device 100. The object recognition device 16 may be omitted from the vehicle system 1.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 includes various display devices, a speaker, a buzzer, a touch panel, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the orientation of the subject vehicle M, and the like.

The navigation device 50, for example, includes a global navigation satellite system (GNSS) receiver 51, a navigation HMI 52, and a path determiner 53. The navigation device 50 stores first map information 54 in a storage device such as an HDD or a flash memory. The GNSS receiver 51 identifies a position of the subject vehicle M based on signals received from GNSS satellites. The position of the subject vehicle M may be identified or complemented using an inertial navigation system (INS) that uses the output of the vehicle sensor 40. The navigation HMI 52 includes a display device, a speaker, a touch panel, a key, and the like. The navigation HMI 52 may be configured to be partially or entirely common as the HMI 30 described above. The path determiner 53, for example, determines a path from a position of the subject vehicle M identified by the GNSS receiver 51 (or an input arbitrary position) to a destination input by a vehicle occupant using the navigation HMI 52 (hereinafter referred to as a path on a map) by referring to the first map information 54. The first map information 54, for example, is information in which a road form is represented using respective links representing roads and respective nodes connected using the links. The first map information 54 may include a curvature of each road, point of interest (POI) information, and the like. The path on the map is output to the MPU 60. The navigation device 50 may perform path guide using the navigation HMI 52 based on the path on the map. The navigation device 50, for example, may be realized using a function of a terminal device such as a smartphone, a tablet terminal, or the like held by the vehicle occupant. The navigation device 50 may transmit a current position and a destination to a navigation server through the communication device 20 and acquire a path equivalent to the path on the map from the navigation device.

The MPU 60, for example, includes a recommended lane determiner 61 and stores second map information 62 in a storage device such as an HDD or a flash memory. The recommended lane determiner 61 divides the path on the map provided from the navigation device 50 into a plurality of blocks (for example, divides the path into blocks of 100 [m] in the traveling direction of the vehicle) and determines a recommended lane for each block by referring to the second map information 62. The recommended lane determiner 61 determines in which of lanes numbered from the left side to travel. In a case in which there is a branching place in the path on the map, the recommended lane determiner 61 determines a recommended lane such that the subject vehicle M can travel along a reasonable path for advancement to a branching destination.

The second map information 62 is map information having higher accuracy than the first map information 54. The second map information 62, for example, includes information on the centers of respective lanes or information on boundaries between lanes and the like. In addition, in the second map information 62, road information, traffic regulation information, address information (addresses and postal codes), facility information, telephone number information, information of prohibition sections in which a mode A or a mode B to be described below is prohibited, and the like may be included. The second map information 62 may be updated as needed by the communication device 20 communicating with another device.

The driver monitor camera 70, for example, is a digital camera using solid-state imaging elements such as a CCD or a CMOS. The driver monitor camera 70 is attached at an arbitrary place in the subject vehicle M in such a position and an orientation that a head part of a vehicle occupant sitting on a driver seat of the subject vehicle M (hereinafter referred to as a driver) can be imaged in front (in a direction in which a face is imaged). For example, the driver monitor camera 70 is attached above a display device disposed at the center of an instrument panel of the subject vehicle M.

The driving operator 80, for example, includes an acceleration pedal, a brake pedal, a shift lever, and other operators in addition to the steering wheel 82. A sensor detecting the amount of an operation or the presence/absence of an operation is installed in the driving operator 80, and a result of detection thereof is output to the automated driving control device 100 or some of all of the traveling driving force output device 200, the brake device 210, and the steering device 220. The steering wheel 82 is one example of "an operator that accepts a driver's steering operation". The operator does not necessarily need to be in a circular form and may be in the form of a variant steering wheel, a joystick, a button, or the like. A steering grasp sensor 84 is attached to the steering wheel 82. The steering grasp sensor 84 is realized by a capacitive sensor or the like and outputs a signal that can be used for detecting whether or not a driver is grasping the steering wheel 82 (this represents that the driver is contacting the steering wheel in the state of adding a force thereto) to the automated driving control device 100.

The automated driving control device 100, for example, includes a first controller 120 and a second controller 160. Each of the first controller 120 and the second controller 160, for example, is realized by a hardware processor such as a central processing unit (CPU) executing a program (software). Some or all of such constituent elements may be realized by hardware (a circuit unit; includes circuitry) such as a large scale integration (LSI), an application specific integrated circuit (ASIC), a field-programmable gate array (FPGA), a graphics processing unit (GPU), or the like or may be realized by software and hardware in cooperation. The program may be stored in a storage device (a storage device including a non-transitory storage medium) such as an HDD, a flash memory, or the like of the automated driving control device 100 in advance or may be stored in a storage medium such as a DVD or a CD-ROM that can be loaded or unloaded and installed in the HDD or the flash memory of the automated driving control device 100 by loading the storage medium (a non-transitory storage medium) into a drive device. The automated driving control device 100 is one example of a "vehicle control device", and a combination of an action plan generator 140 and the second controller 160 is one example of a "driving controller".

Figure 2:
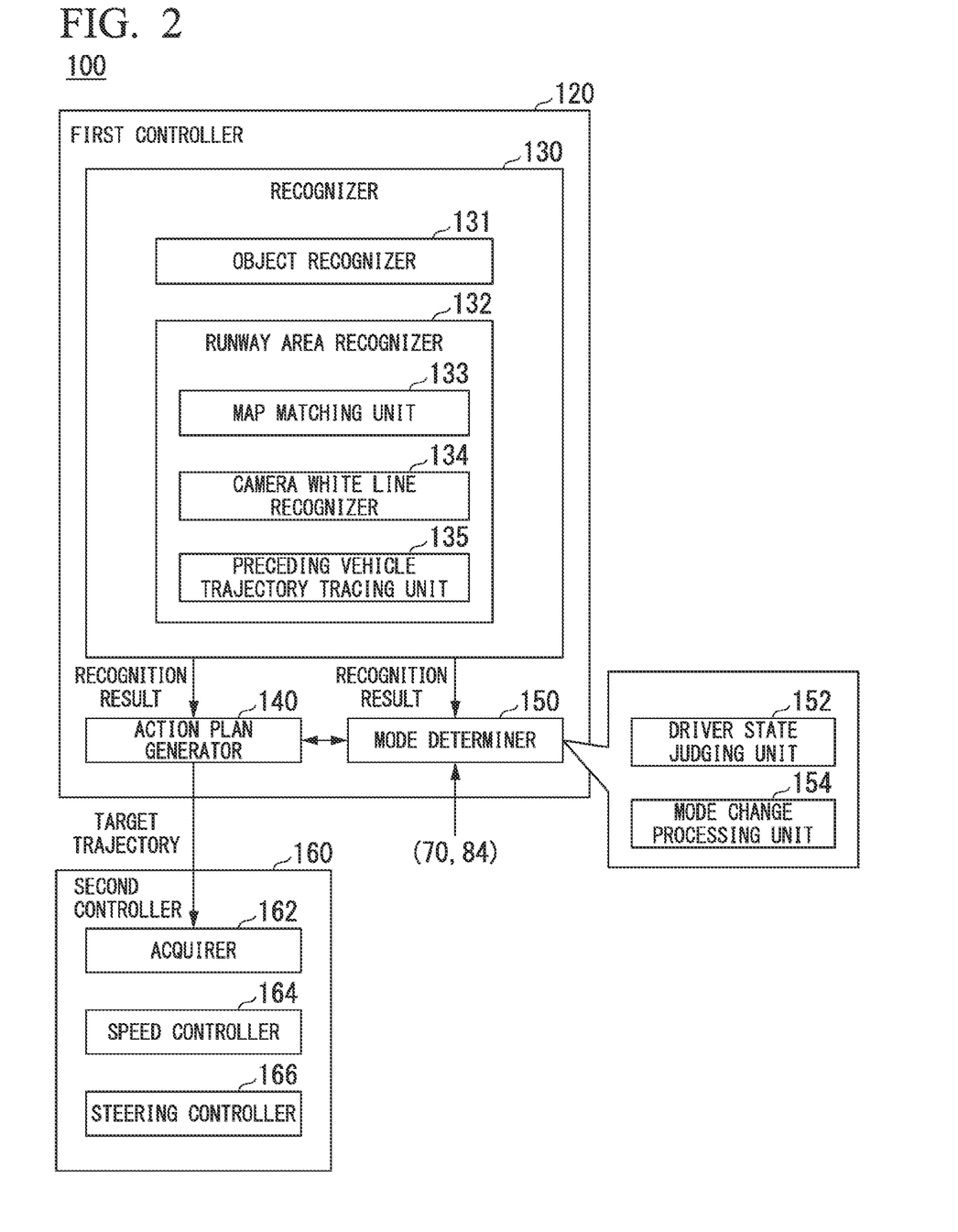
FIG. 2 is a functional configuration diagram of a first controller and a second controller.

FIG. 2 is a functional configuration diagram of the first controller 120 and the second controller 160. The first controller 120, for example, includes a recognizer 130, an action plan generator 140, and a mode determiner 150. The first controller 120, for example, simultaneously realizes functions using artificial intelligence (AI) and functions using a model provided in advance. For example, a function of "recognizing an intersection" may be realized by executing recognition of an intersection using deep learning or the like and recognition based on conditions given in advance (a signal, a road marking, and the like can be used for pattern matching) at the same time and comprehensively evaluating both recognitions by assigning scores to them. Accordingly, the reliability of automated driving is secured.

The recognizer 130, for example, includes an object recognizer 131 and a runway area recognizer 132. The runway area recognizer 132 includes a map matching unit 133, a camera white line recognizer 134, and a preceding vehicle trajectory tracing unit 135.

The object recognizer 131 recognizes states such as positions, speeds, and accelerations of objects in the vicinity of the subject vehicle M based on information input from the camera 10, the radar device 12, and the LIDAR 14 through the object recognition device 16. In a case in which a plurality of vehicles are present in front of the subject vehicle M, the recognizer 130 recognizes an inter-vehicle distance and the like for each of the vehicles. A position of an object, for example, is recognized as a position in an absolute coordinate system (hereinafter referred to as a vehicle coordinate system) having a reference point of the subject vehicle M (a center of gravity, a driving shaft center, or the like, and more specifically, an arbitrary point on a center axis in a vehicle width direction of the subject vehicle M is appropriate) as an origin point and is used for control. The position of an object may be represented as a representative point such as the center of gravity of the object, the center of a front end part in the vehicle width direction, the center of a rear end part in the vehicle width direction, a corner, or a side end part of the object or may be represented using an area. Positions of a plurality of parts may be recognized as necessary.

The map matching unit 133 combines the position of the subject vehicle M identified by the navigation device 50, an image captured by the camera 10, an output of an azimuth sensor included in the vehicle sensor 40, and the like with the second map information 62 and recognizes a road and a lane where the subject vehicle M is traveling on the map. In addition, the map matching unit 133 recognizes a position of the representative point of the subject vehicle M with respect to the widthwise direction of a recommended lane (hereinafter, a horizontal position) and an angle at which the posture of the subject vehicle M at that time point is inclined with respect to an extending direction of the recommended lane (hereinafter referred to as a yaw angle) based on the various kinds of information described above. Then, the map matching unit 133 recognizes a first runway area acquired by applying an extending area of the recommended lane acquired from the second map information 62 based on a result of the recognition described above to a vehicle coordinate system using the subject vehicle M as a reference.

By analyzing the image captured by the camera 10, the camera white line recognizer 134 recognizes a second runway area acquired by applying the extending area of the recommended lane to the vehicle coordinate system using the subject vehicle M as a reference. For example, the camera white line recognizer 134 extracts edge points each having a large luminance difference from adjacent pixels in an image and recognizes road division lines by aligning edge points estimated to be on both sides of the recommended lane. Then, the camera white line recognizer 134 virtually sets road division lines in the vehicle coordinate system by converting positions of points of the road division lines in an image plane into those of the vehicle coordinate system and sets a range partitioned by the road division lines as a second runway area.

The preceding vehicle trajectory tracing unit 135 sets a third runway based on a trajectory of a vehicle traveling in front of the subject vehicle M (a preceding vehicle) in the same lane as the subject vehicle M or in the recommended lane. For example, the preceding vehicle trajectory tracing unit 135 recognizes representative points such as a rear end part, a center part, and the like of the preceding vehicle, acquires a trajectory of the representative points on a road, and sets an area acquired by extending a half of a general lane width (for example, about 3 to 5 [m]) to the left and right sides using the trajectory as the center as a third runway area.

Then, the runway area recognizer 132 determines a runway area to be passed to the action plan generator 140 based on some or all of the first runway area, the second runway area, and the third runway area. For example, the runway area recognizer 132 may determine runway areas with priority levels assigned thereto such as a case in which a first runway area is selected when the first runway area is acquired, a second runway area is selected when the first runway area is not acquired or the reliability thereof is low, and a third runway area is selected when neither the first runway area nor the second runway area is acquired or reliabilities of both are low. The runway area recognizer 132 may determine a runway area by combining some of the first runway area, the second runway area, and the third runway area. The reason for this is that, particularly, there are cases in which the sizes of the first runway area, the second runway area, and the third runway area in the longitudinal direction are not the same, and a longer runway area is acquired by combining the runway areas.

The action plan generator 140 basically travels in a recommended lane determined by the recommended lane determiner 61 and generates a target trajectory along which the subject vehicle M will automatedly travel (travel without being dependent on a driver's operation) in the future such that a surrounding status of the subject vehicle M can be responded to. The target trajectory, for example, includes a speed element. For example, the target trajectory is represented as a sequence of places (trajectory points) at which the subject vehicle M will arrive. Trajectory points are places at which the subject vehicle M will arrive at respective predetermined traveling distances (for example, about every several [m]) as distances along the road, and separately from that, a target speed and a target acceleration for each of predetermined sampling times (for example, a fraction of a [sec]) are generated as a part of a target trajectory. A trajectory point may be a position at which the subject vehicle M will arrive at a sampling time for every predetermined sampling time. In such a case, information of a target speed and a target acceleration is represented at the interval of trajectory points.

In generating a target trajectory, the action plan generator 140 may set events of automated driving. As events of automated driving, there are a constant-speed traveling event, a low-speed following traveling event, a lane change event, a branching event, a merging event, a take-over event, and the like. The action plan generator 140 generates a target trajectory according to the operated events.

The mode determiner 150 determines the drive mode of the subject vehicle M to be one of a plurality of drive modes in which tasks imposed on a driver are different. For example, the mode determiner 150 includes a driver state judging unit 152 and a mode change processing unit 154. Such individual functions will be described below.

Figure 3:
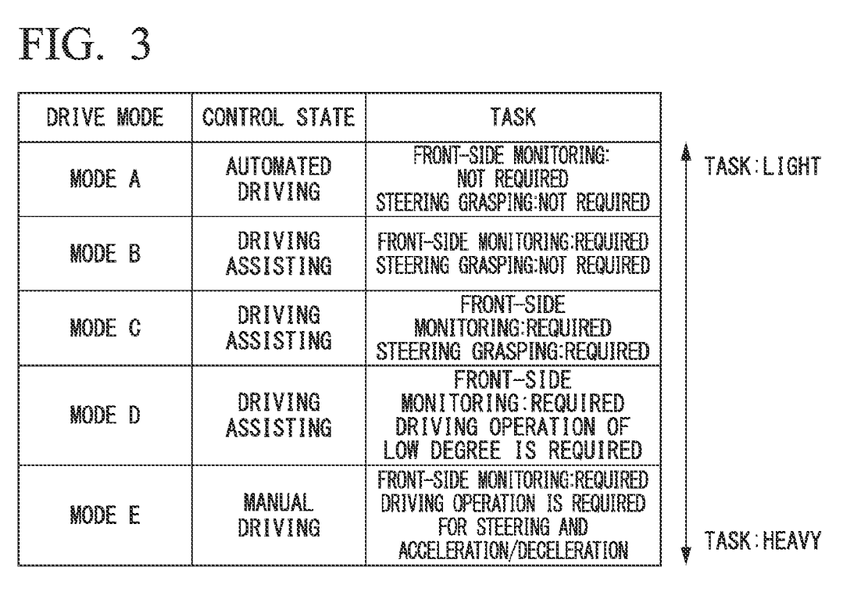
FIG. 3 is a diagram illustrating an example of a correspondence relation between a drive mode, a control state of a subject vehicle, and a task.

FIG. 3 is a diagram illustrating an example of a correspondence relation among a drive mode, a control state of a subject vehicle M, and a task. As drive modes of the subject vehicle M, for example, there are five modes including Mode A to Mode E. A control state, that is the degree of automation of driving control of the subject vehicle M, is the highest in Mode A and is lowered in order of Mode B, Mode C, and Mode D after Mode A, with Mode E having the lowest control state. On the other hand, the tasks imposed on a driver are the lightest in Mode A and becomes heavier in order of Mode B, Mode C, and Mode D after Mode A, with the Mode E being heaviest. In Modes D and E, the control state is a state other than automated driving, and thus the automated driving control device 100 ends control relating to automated driving and is responsible until a transition to driving assistance or manual driving is performed. Hereinafter, details of each drive mode will be described as an example. Mode A and/or Mode B represents one example of a "second drive mode," and some or all of Mode C, Mode D, and mode E represent one example of a "first drive mode."

In Mode A, an automated driving state occurs, and neither front-side monitoring nor grasping of the steering wheel 82 (steering wheel grasping in the drawing) is imposed on a driver. However, even in Mode A, the driver needs to have a body posture that can be quickly transitioned to manual driving in response to a request from a system having the automated driving control device 100 as the center. The automated driving described here means that both steering and acceleration/deceleration are controlled without being dependent on a driver's operation. Here, a front side means a space in the traveling direction of the subject vehicle M that is visible through a front windshield. Mode A, for example, is a drive mode that can be executed in a case in which conditions such as the subject vehicle M traveling at a speed equal to or lower than a predetermined speed (for example, about 50 [km/h]) on a motorway such as an expressway and a preceding vehicle that is a following target being present are satisfied and may be referred to as a traffic jam pilot (TJP). In a case in which such conditions are not satisfied, the mode determiner 150 changes the drive mode of the subject vehicle M to Mode B.

In Mode B, a driving assisting state occurs, a task of monitoring the front side of the subject vehicle M (hereinafter referred to as front-side monitoring) is imposed on the driver, and a task of grasping the steering wheel 82 is not imposed. In Mode C, a driving assisting state occurs, and the task of front-side monitoring and the task of grasping the steering wheel 82 are imposed on the driver. Mode D is a drive mode in which a driver's driving operation of a certain degree is necessary for at least one of steering and acceleration/deceleration of the subject vehicle M. For example, in Mode D, driving assistance such as adaptive cruise control (ACC) and a lane keeping assist system (LKAS) is performed. In Mode E, a manual driving state in which a driver's driving operations are necessary for both steering and acceleration/deceleration occurs. In both Mode D and Mode E, naturally, the task of monitoring the front side of the subject vehicle M is imposed on the driver.

The automated driving control device 100 (and a driving assisting device (not illustrated)) performs an automated lane change according to a drive mode. As automated lane changes, there are an automated lane change (1) according to a system request and an automated lane change (2) according to a driver's request. As the automated lane change (1), there are an automated lane change for passing that is performed in a case in which the speed of a preceding vehicle is lower than the speed of the subject vehicle by a reference or more and an automated lane change for traveling toward a destination (an automated lane change according to a change of a recommended lane). In the automated lane change (2), in a case in which conditions relating to a speed, a positional relation with a surrounding vehicle, and the like are satisfied, when a direction indicator is operated by a driver, the lane of the subject vehicle M is changed toward the direction in which it is operated.

The automated driving control device 100 performs neither of the automated lane changes (1) and (2) in Mode A. The automated driving control device 100 performs both of the automated lane changes (1) and (2) in Modes B and C. The driving assisting device (not illustrated) performs the automated lane change (2) without performing the automated lane change (1) in Mode D. Neither of the automated lane changes (1) and (2) is performed in Mode E.

In a case in which a task relating to the determined drive mode (hereinafter referred to as a current drive mode) is not performed by a driver, the mode determiner 150 changes the drive mode of the subject vehicle M to a drive mode of which a task is heavier.

For example, in a case in which a driver has a body posture in which a transition to manual driving cannot be performed in accordance with a request from the system (for example, in a case in which the driver continues to look outside an allowed area or in a case in which a sign making it difficult to perform driving is detected) in Mode A, the mode determiner 150 performs control of urging the driver to make a transition to manual driving using the HMI 30 and gradually pulling over to the road shoulder and stopping the subject vehicle M and stopping the automated driving in a case in which the driver does not respond. After the automated driving is stopped, the subject vehicle comes into the state of Mode D or E, and the subject vehicle M can be started by a driver's manual operation. Hereinafter, this similarly applies to "stopping of automated driving," In a case in which a driver is not monitoring the front side in Mode B, the mode determiner 150 performs control of urging the driver to monitor the front side using the HMI 30 and gradually pulling over to the road shoulder and stopping the subject vehicle M and stopping the automated driving in a case in which the driver does not respond. In a case in which the driver is not monitoring the front side or in a case in which the driver is not grasping the steering wheel 82 in Mode C, the mode determiner 150 performs control of urging the driver to monitor the front side using the HMI 30 and/or grasp the steering wheel 82 and gradually pulling over to the road shoulder and stopping the subject vehicle M and stopping the automated driving in a case in which the driver does not respond.

In order to change the mode, the driver state judging unit 152 monitors the state of the driver and judges whether or not the state of the driver is a state appropriate for the task. For example, the driver state judging unit 152 performs a posture estimating process by analyzing an image captured by the driver monitor camera 70 and judges whether or not the driver has a body posture in which a transition to manual driving cannot be performed in response to a request from the system. The driver state judging unit 152 performs a visual line estimating process by analyzing the image captured by the driver monitor camera 70 and judges whether or not the driver is monitoring the front side.

The mode change processing unit 154 performs various processes for changing the mode. For example, the mode change processing unit 154 instructs the action plan generator 140 to generate a target trajectory for stopping on the road shoulder, instructs the driving assisting device (not illustrated) to operate, or controls the HMI 30 for urging the driver to perform an action.

The second controller 160 performs control of the traveling driving force output device 200, the brake device 210, and the steering device 220 such that the subject vehicle M passes through the target trajectory generated by the action plan generator 140 at a scheduled time.

Referring back to FIG. 2, the second controller 160, for example, includes an acquirer 162, a speed controller 164, and a steering controller 166. The acquirer 162 acquires information of a target trajectory (trajectory points) generated by the action plan generator 140 and stores the acquired target trajectory in a memory (not illustrated). The speed controller 164 controls the traveling driving force output device 200 or the brake device 210 based on speed elements accompanying the target trajectory stored in the memory. The steering controller 166 controls the steering device 220 in accordance with a bending state of the target trajectory stored in the memory. The processes of the speed controller 164 and the steering controller 166, for example, are realized by a combination of feed-forward control and feedback control. As one example, the steering controller 166 executes feed-forward control according to a curvature of a road disposed in front of the subject vehicle M and feedback control based on a deviation from a target trajectory in combination.

The traveling driving force output device 200 outputs a traveling driving force (torque) for enabling the vehicle to travel to driving wheels. The traveling driving force output device 200, for example, includes a combination of an internal combustion engine, an electric motor, and a transmission, and an electronic controller (ECU) controlling these. The ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the orientation of the steering wheel by applying a force to a rack and pinion mechanism. The steering ECU changes the orientation of the steering wheel by driving an electric motor in accordance with information input from the second controller 160 or information input from the driving operator 80.

[Mode Change Control]

Figure 4:
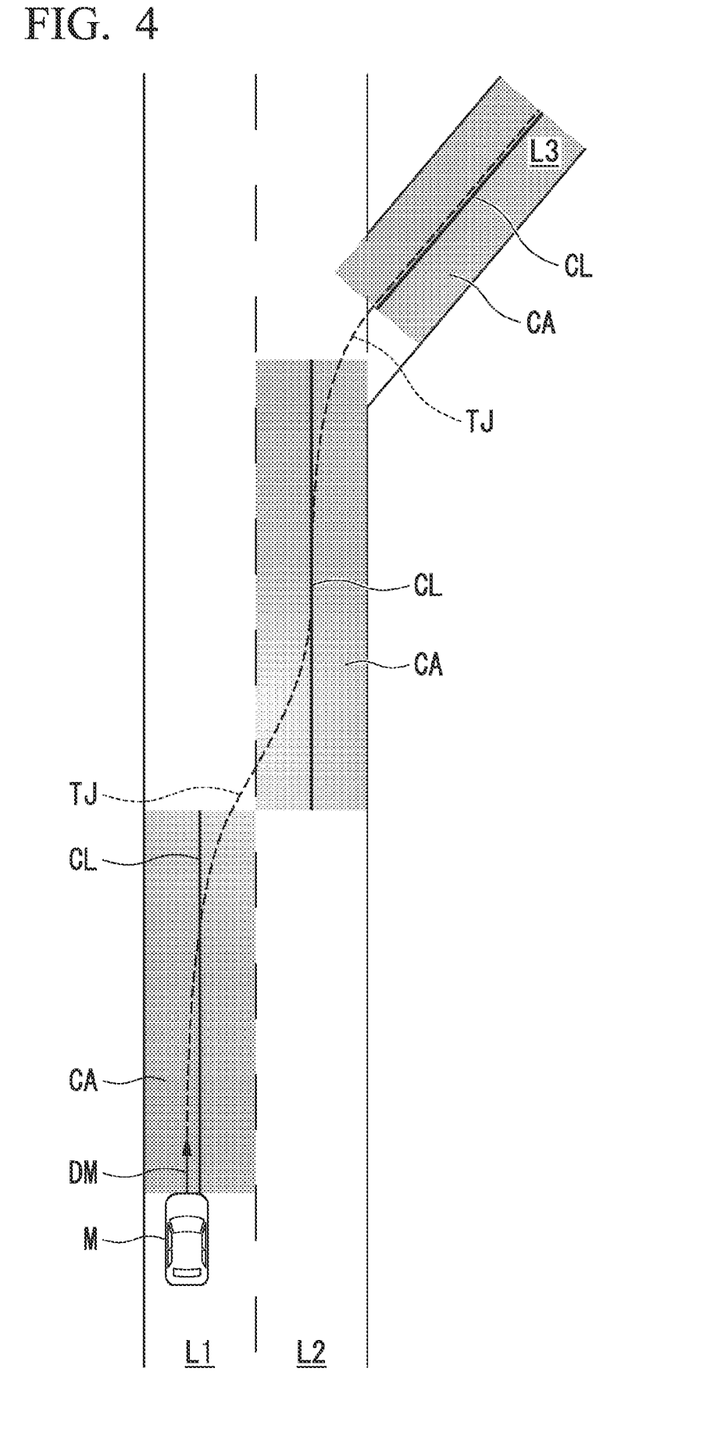
FIG. 4 is a diagram illustrating an example of a center line in a certain view and a target trajectory corresponding thereto.

Hereinafter, an example of the process performed by the mode change processing unit 154 will be described. During execution of a main event, the action plan generator 140 generates a target trajectory such that it follows the center of a runway area recognized by the runway area recognizer 132 (hereinafter, a center line) and causes the vehicle described above to travel along the target trajectory. FIG. 4 is a diagram illustrating an example of a center line CL in a certain view and a target trajectory TJ corresponding thereto. In the drawing, a runway area (≈a recommended lane) CA, a center line of the runway area CL, a traveling direction DM of the subject vehicle M, and lanes L1 to L3 are illustrated. The subject vehicle M is traveling in the lane L1, and a destination is at an end of the branch lane L3, and thus the runway area CA is set to be changed in order of the lane L1→the lane L2→the branch lane L3. Thus, the position of the center line CL is changed in order of the lane L1→the lane L2→the branch lane L3. In such a situation, by smoothly connecting the center lines CL that may be switched over the lane in a curved line, the action plan generator 140 generates a target trajectory TJ. Although the target trajectory TJ may actually be an aggregation of trajectory points, here, the target trajectory TJ is represented on a curved line.

In this way, the target trajectory TJ is generated, and the subject vehicle M travels along the target trajectory TJ, and thus only the width of one lane is separated away even at the time of lane change without assuming that the subject vehicle M and the center line CL are separated away much. In the case of being separated away more, it is assumed that abnormality or performance degradation occurs in any one of the process of the runway area recognizer 132, information used by the runway area recognizer 132 for the process, and the process of the action plan generator 140. Thus, in a case in which a distance between the center line CL and the reference point of the subject vehicle M becomes a reference distance Dref or more, the mode change processing unit 154 changes the drive mode of the subject vehicle M from the second drive mode to the first drive mode. As described above, Mode A and/or Mode B represent one example of a "second drive mode", and some or all of Mode C, Mode D, and Mode E represent one example of a "first drive mode". Hereinafter, it is assumed that Mode A and Mode B are the "second drive mode", and Mode C is the "first drive mode".

Figure 5:
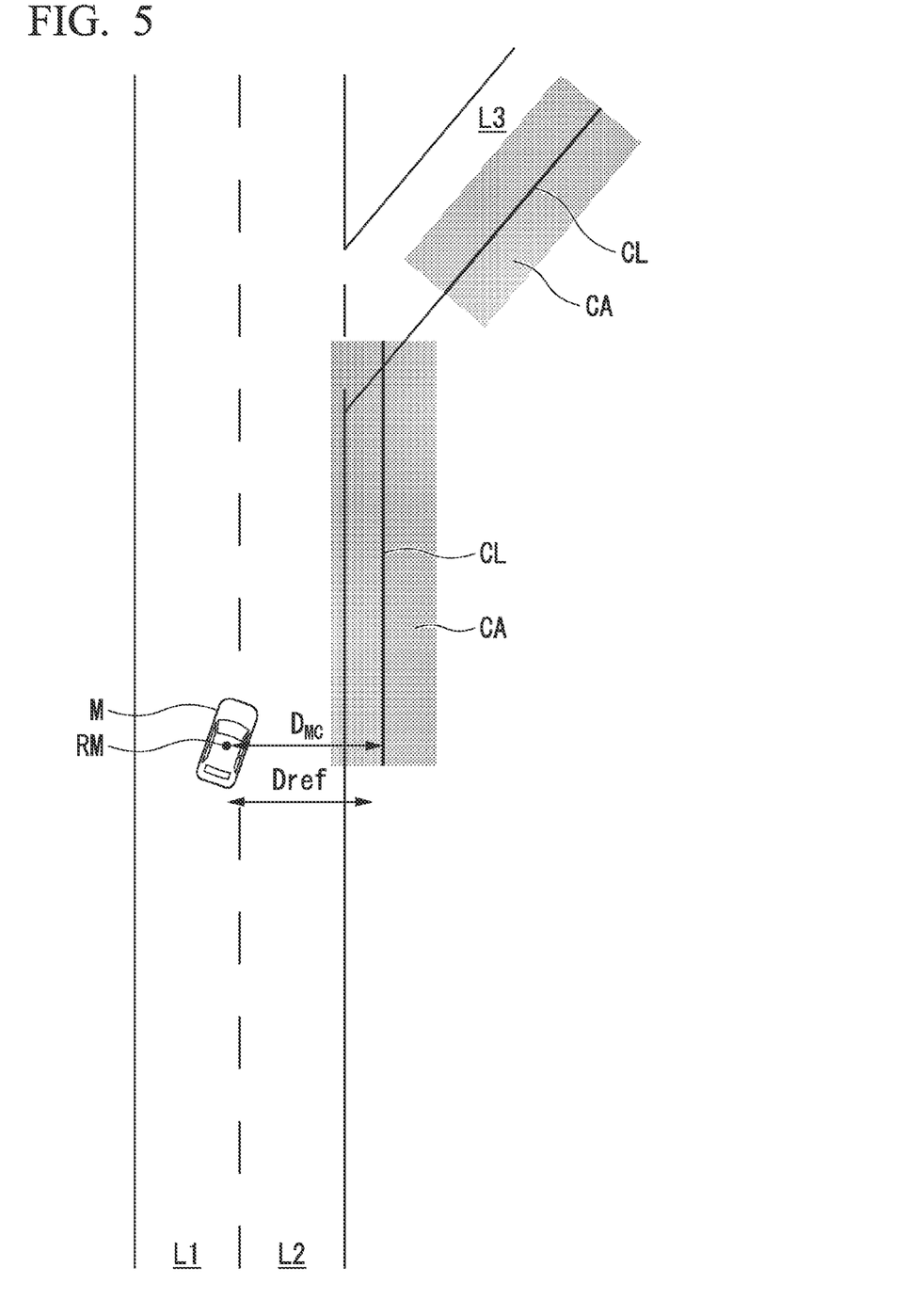
FIG. 5 is a diagram illustrating an example of a view in which a distance between a subject vehicle and a center line is equal to or longer than a reference distance.

In consideration of the situations described above, for example, the reference distance Ref is set to a distance that is longer than a lane width corresponding to one lane and is shorter than a lane width corresponding to two lanes. More specifically, the reference distance Ref may be set to about 4 to 7 [m]. FIG. 5 is a diagram illustrating an example of a view in which a distance between the subject vehicle M and the center line CL is equal to or longer than the reference distance Dref. In the drawing, a reference point RM of the subject vehicle M and a distance $D_{MC}$ between the reference point RM of the subject vehicle M and the center line CL are illustrated. The reference point RM is set to an arbitrary place such as the center of gravity of the subject vehicle M, the center of a rear wheel shaft, the center of a front wheel shaft, or the like. The reference point RM may be an origin point of the vehicle coordinate system described above. In this example, the runway area CA greatly deviates to the right side from the lane L2 that the runway area is to originally overlap. When Mode A or Mode B is continued in such a situation, an undesirable situation may occur. In the relating situation, the mode change processing unit 154 switches the drive mode of the subject vehicle M from Mode A and Mode B to Mode C. In accordance with this, a vicinity monitoring obligation and a drive operation can be left for a driver of the subject vehicle M at an appropriate timing, and it can be inhibited to cause confusion in a traffic situation. In this way, according to the mode change processing unit 154 of the embodiment, switching control of drive modes can be performed more appropriately.

The mode change processing unit 154 may change the reference distance Ref in accordance with whether the current drive mode of the subject vehicle M is Mode A or Mode B. Automated lane change is not performed in Mode A, and thus the subject vehicle M and the center line CL being separated away by a lane width corresponding to one lane is rare. Thus, in a case in which the current drive mode of the subject vehicle M is Mode A, the mode change processing unit 154, for example, may change the reference distance Ref to a distance of the lane width corresponding to one lane or a distance acquired by multiplying this by a coefficient of about 0.5 to 1.

The mode change processing unit 154 may change the reference distance Ref based on the current speed of the subject vehicle M. In such a case, the mode change processing unit 154 may change the reference distance Ref such that the reference distance Ref becomes longer as the current speed of the subject vehicle M becomes lower, and the reference distance Ref becomes shorter as the current speed of the subject vehicle M becomes higher. The reason for this is that, as the speed becomes higher, it is difficult for a behavior of the subject vehicle M such as traversing of the lane to be generated, and a chance of the subject vehicle M and the center line CL being separated away becomes low.

The mode change processing unit 154 may change the reference distance Ref based on the curvature of the road on which the subject vehicle M is present. In such a case, the mode change processing unit 154 may change the reference distance Ref such that the reference distance Ref becomes shorter as the curvature of the road on which the subject vehicle M is present becomes smaller (as the radius of curvature becomes larger), and the reference distance Ref becomes longer as the curvature of the road on which the subject vehicle M is present becomes larger (as the radius of curvature becomes smaller). The reason for this is that there is a high change of the subject vehicle M and the center line CL being separated away at a sharp curve having a large curvature.

Figure 6:
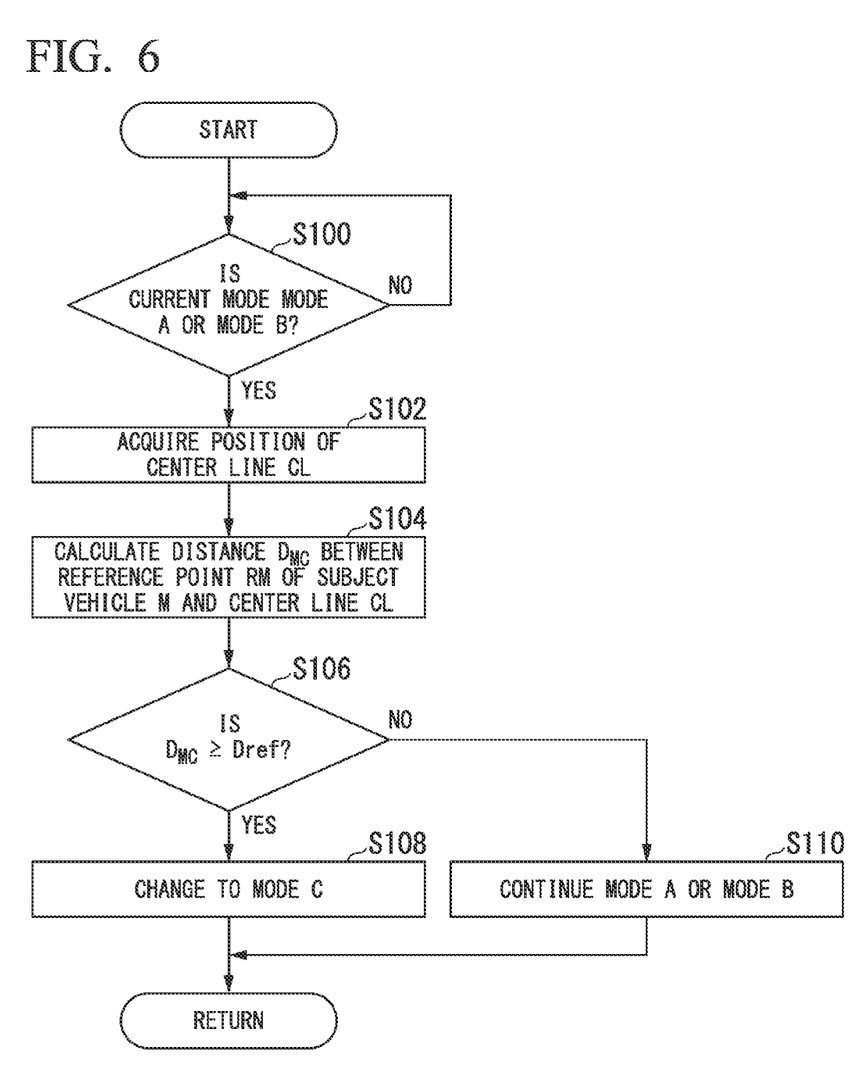
FIG. 6 is a flowchart illustrating an example of the flow of a process performed by a mode change processing unit.

FIG. 6 is a flowchart illustrating an example of the flow of a process performed by the mode change processing unit 154. First, the mode change processing unit 154 determines whether the drive mode of the subject vehicle M is Mode A or Mode B (Step S100). In a case in which it is determined that the drive mode of the subject vehicle M is not Mode A or Mode B, the process of Step S100 is repeatedly performed.

In a case in which it is determined that the drive mode of the subject vehicle M is Mode A or Mode B, the mode change processing unit 154 acquires the position of the center line CL (Step S102), calculates a distance $D_{MC}$ between the reference point RM of the subject vehicle M and the center line CL (Step S104), and determines whether or not the distance $D_{MC}$ is equal to or longer than the reference distance Ref (Step S106). In a case in which it is determined that the distance $D_{MC}$ is equal to or longer than the reference distance Ref, the mode change processing unit 154 changes the drive mode of the subject vehicle M to Mode C (Step S108). On the other hand, in a case in which it is determined that the distance $D_{MC}$ is shorter than the reference distance Ref, the mode change processing unit 154 continues Mode A or Mode B (Step S110).

According to the embodiment described above, a runway area CA in which the subject vehicle M is to travel is recognized, a target trajectory TJ is generated such that it follows the center of the runway area CA in a lateral direction, the subject vehicle M is caused to travel along the target trajectory TJ, and, in a case in which a distance $D_{MC}$ between the center (the center line CL) and the reference point RM of the subject vehicle M is equal to or longer than the reference distance Dref, the drive mode of the subject vehicle M is changed from the second drive mode to the first drive mode, and thus switching control of drive modes can be performed more appropriately.

As above, although the embodiments have been described in forms for performing the present invention, the present invention is not limited to such embodiments at all, and various modifications and substitutions can be performed in a range not departing from the concept of the present invention.

What is claimed is:

1. A vehicle control device comprising:
a storage device storing a program; and
a hardware processor executing the program stored in the storage device to:
recognize a runway area in which a vehicle is to travel;
generate a target trajectory such that the target trajectory follows a center of the recognized runway area in a lateral direction and cause the vehicle to travel along the target trajectory without depending on an operation of a driver of the vehicle;
determine a drive mode of the vehicle as one of a plurality of drive modes including a first drive mode and a second drive mode, the second drive mode being a drive mode in which a lighter task is imposed on the driver than that in the first drive mode, some of the plurality of drive modes including at least the second drive mode being modes in which the vehicle is caused to travel along the target trajectory without depending on an operation of a driver of the vehicle;
change the drive mode of the vehicle to a drive mode in which a heavier task is imposed on the driver, in a case in which a task relating to the determined drive mode is not performed by the driver; and
change the drive mode of the vehicle from the second drive mode to the first drive mode, in a case in which a distance between the center and a reference point of the vehicle is equal to or longer than a reference distance.

2. The vehicle control device according to claim 1, wherein the hardware processor sets the reference distance to a distance that is longer than a lane width of one lane and is shorter than a lane width of two lanes.

3. The vehicle control device according to claim 1, wherein a plurality of drive modes of which tasks imposed on the driver are different from each other are included in the second drive mode, and
wherein the hardware processor changes the reference distance based on a drive mode that is being executed among the second drive modes.

4. The vehicle control device according to claim 1, wherein the hardware processor changes the reference distance based on a speed of the vehicle.

5. The vehicle control device according to claim 1, wherein the hardware processor changes the reference distance based on a curvature of a road on which the vehicle is present.

6. The vehicle control device according to claim 1, wherein the reference point of the vehicle is a point on a center axis in a vehicle width direction of the vehicle.

7. A vehicle control method using a computer, the vehicle control method comprising:
recognizing a runway area in which a vehicle is to travel;
generating a target trajectory such that the target trajectory follows a center of the recognized runway area in a lateral direction without depending on an operation of a driver of the vehicle and causing the vehicle to travel along the target trajectory;
determining a drive mode of the vehicle as being one of a plurality of drive modes including a first drive mode and a second drive mode, the second drive mode being a drive mode in which a lighter task is imposed on the driver than that in the first drive mode, some of the plurality of drive modes including at least the second drive mode being modes in which the vehicle is caused to travel along the target trajectory without depending on an operation of a driver of the vehicle;
changing the drive mode of the vehicle to a drive mode in which a heavier task is imposed on the driver in a case in which a task relating to the determined drive mode is not performed by the driver; and
changing the drive mode of the vehicle from the second drive mode to the first drive mode in a case in which a distance between the center and a reference point of the vehicle is equal to or longer than a reference distance.

* * * * *